US006820468B2

(12) United States Patent
Powers et al.

(10) Patent No.: US 6,820,468 B2
(45) Date of Patent: Nov. 23, 2004

(54) FIXTURE FOR HOLDING A GAS TURBINE ENGINE BLADE

(75) Inventors: John Matthew Powers, Independence, KY (US); Brian Dudley Dorrel, Batesville, IN (US)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 09/817,885

(22) Filed: Mar. 26, 2001

(65) Prior Publication Data

US 2002/0136637 A1 Sep. 26, 2002

(51) Int. Cl.[7] .......................... G01M 3/04; G01F 15/14
(52) U.S. Cl. ....................................... 73/49.7; 73/432.1
(58) Field of Search ............................... 73/432.1, 49.7, 73/865.9; 451/364, 365; 269/150, 237

(56) References Cited

U.S. PATENT DOCUMENTS

| | | | |
|---|---|---|---|
| 3,818,646 A | 6/1974 | Peterson | |
| 3,940,122 A | 2/1976 | Janzen | |
| 4,805,351 A | 2/1989 | Dobson et al. | |
| 4,829,720 A | 5/1989 | Cavalieri | |
| 5,094,436 A | 3/1992 | Stephan | |
| 5,226,637 A | 7/1993 | Kitaura et al. | |
| 5,527,435 A * | 6/1996 | Arnau | 205/640 |
| 5,544,873 A | 8/1996 | Vickers et al. | |
| 6,034,344 A | 3/2000 | Ittleson et al. | |
| 6,561,048 B2 * | 5/2003 | Schumacher et al. | 73/865.9 |

* cited by examiner

*Primary Examiner*—Hezron Williams
*Assistant Examiner*—Tamiko Bellamy
(74) *Attorney, Agent, or Firm*—V. G. Ramaswamy; Sonnenschein Nath & Rosenthal LLP

(57) ABSTRACT

A fixture for holding a gas turbine engine blade having an airfoil extending outward from a shank and a dovetail extending inward from the shank for attaching the blade to a disk of the engine. The dovetail includes at least one pair of protrusions extending fore and aft along opposite sides of the blade. Each of the protrusions including a pressure face generally facing the airfoil of the blade for engaging the disk to retain the blade in the disk during operation of the engine. The fixture includes a support for receiving the dovetail and a clamp mounted adjacent the support for movement between a clamped position in which the clamp engages the dovetail to hold the dovetail against the support and a released position in which the clamp disengages the dovetail to permit removal of the blade from the fixture.

16 Claims, 7 Drawing Sheets

FIXTURE FOR HOLDING A GAS TURBINE ENGINE BLADE

BACKGROUND OF THE INVENTION

The present invention relates generally to a fixture and more particularly to a fixture for holding air cooled gas turbine engine blades.

Many conventional gas turbine engine blades have interior passages for transporting cooling air to remove heat from the blades. For instance, some conventional turbine blades have a labyrinth of interior passages through which cooling air is transported to cool the blades by convective heat transfer. Cooling holes in the surface of the blades permit the cooling air to exit the interior passages and form film cooling along the exterior surfaces of the blades. On occasion, the interior passages and/or the cooling holes become blocked, resulting in insufficient blade cooling. Conversely, the cooling holes can be made too large, resulting in too much cooling air being directed through the holes and leaving an insufficient amount of cooling air for other cooling circuits in the blade or for other blades in the engine. Thus, the blades are flow checked during manufacture and periodically at maintenance intervals to ensure appropriate amounts of cooling air flow through each blade cooling circuit.

In the past, a fixture was used to hold the blades during flow check. This fixture included a support for receiving a dovetail of the blade and a clamp mounted adjacent the support which engaged a flowpath surface of a platform of the blade to hold the dovetail against the support. Because the flowpath surface of the blade platform is an as-cast feature, there is significant variation in the distance between the flowpath surface of the platform and the end of the dovetail where cooling air enters the blade. Accordingly, the fixture allowed leakage between the support and the end of the dovetail which resulted in inaccurate flow measurements.

SUMMARY OF THE INVENTION

Among the several features of the present invention may be noted the provision of a fixture for holding a gas turbine engine blade having an airfoil extending outward from a shank and a dovetail extending inward from the shank for attaching the blade to a disk of the engine. The dovetail includes at least one pair of protrusions extending fore and aft along opposite sides of the blade. Each of the protrusions includes a pressure face generally facing the airfoil of the blade for engaging the disk to retain the blade in the disk during operation of the engine. The fixture comprises a support for receiving the dovetail, and a clamp mounted adjacent the support for movement between a clamped position in which the clamp engages the dovetail to hold the dovetail against the support and a released position in which the clamp disengages the dovetail to permit removal of the blade from the fixture.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
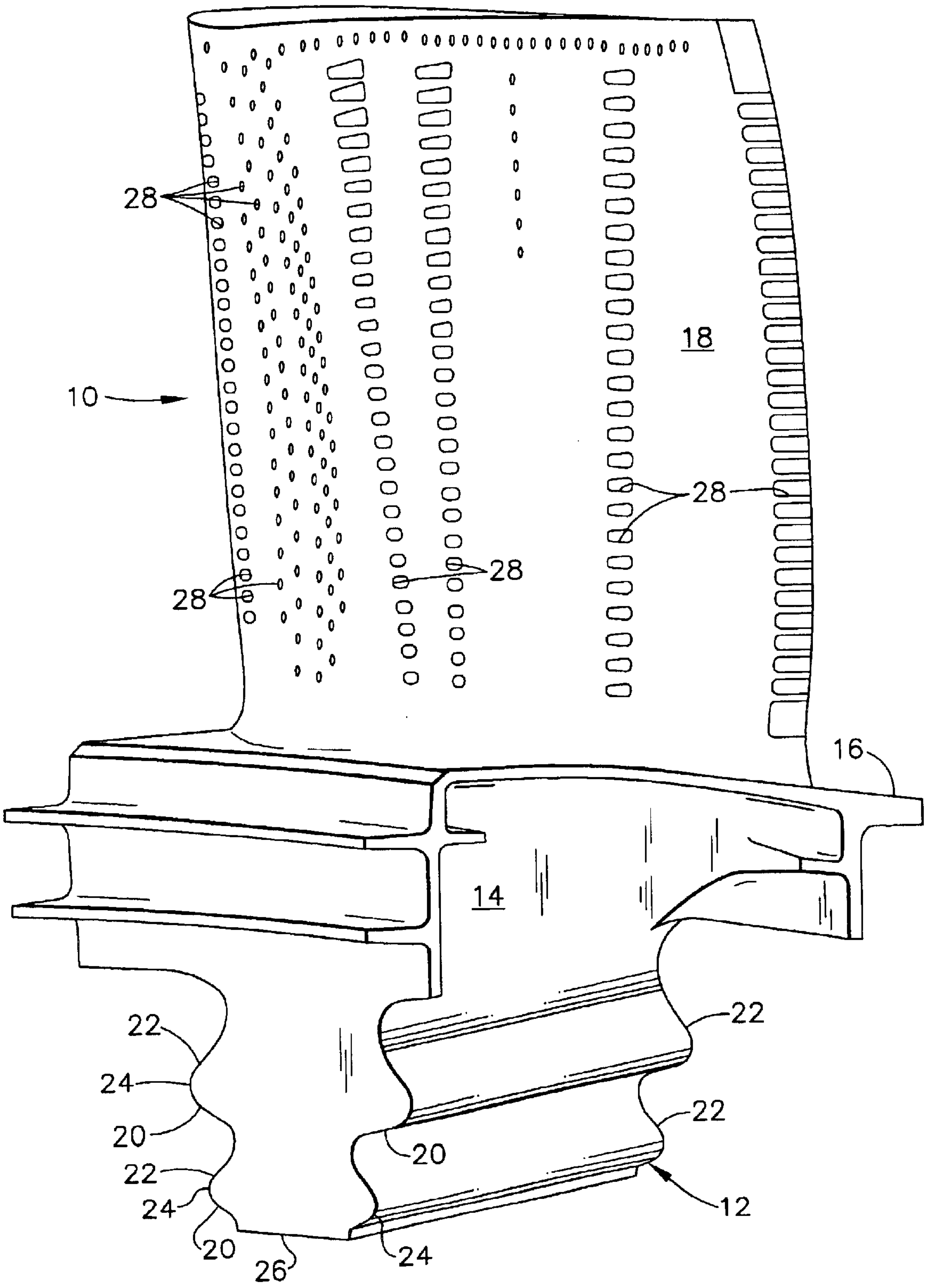
FIG. 1 is a perspective of a gas turbine engine blade of the type which a fixture of the present invention is adapted to hold.

Referring now to the drawings and in particular to FIG. 1, an air cooled gas turbine engine blade is designated in its entirety by the reference number 10. The blade 10 includes a conventional dovetail, generally designated 12, sized and shaped for receipt in a complimentary slot in a disk (not shown) of a gas turbine engine for retaining the blade in the disk. A shank 14 extends outward (relative to a centerline of the engine) from the dovetail to a platform 16 which forms an inner flowpath surface of the engine. An airfoil 18 extends outward from the platform 16. The dovetail 12 includes at least one pair of protrusions 20 extending fore and aft along opposite sides of the blade 10. Each protrusion 20 includes a pressure face 22 generally facing the airfoil 18 of the blade 10 for engaging the disk to retain the blade in the disk. Each pair of protrusions 20 has laterally opposite tips 24. Internal passages (not shown) extend through the blade 10 from openings or inlet ports (not shown) at the inboard end 26 of the dovetail 12 to cooling holes 28 in the surface of the airfoil 18. Cooling air enters the blade 10 through the openings in the inboard end 26 of the dovetail and exits the blade through the cooling holes 28 to cool the blade and shield the airfoil from hot flowpath gases.

Figure 2:
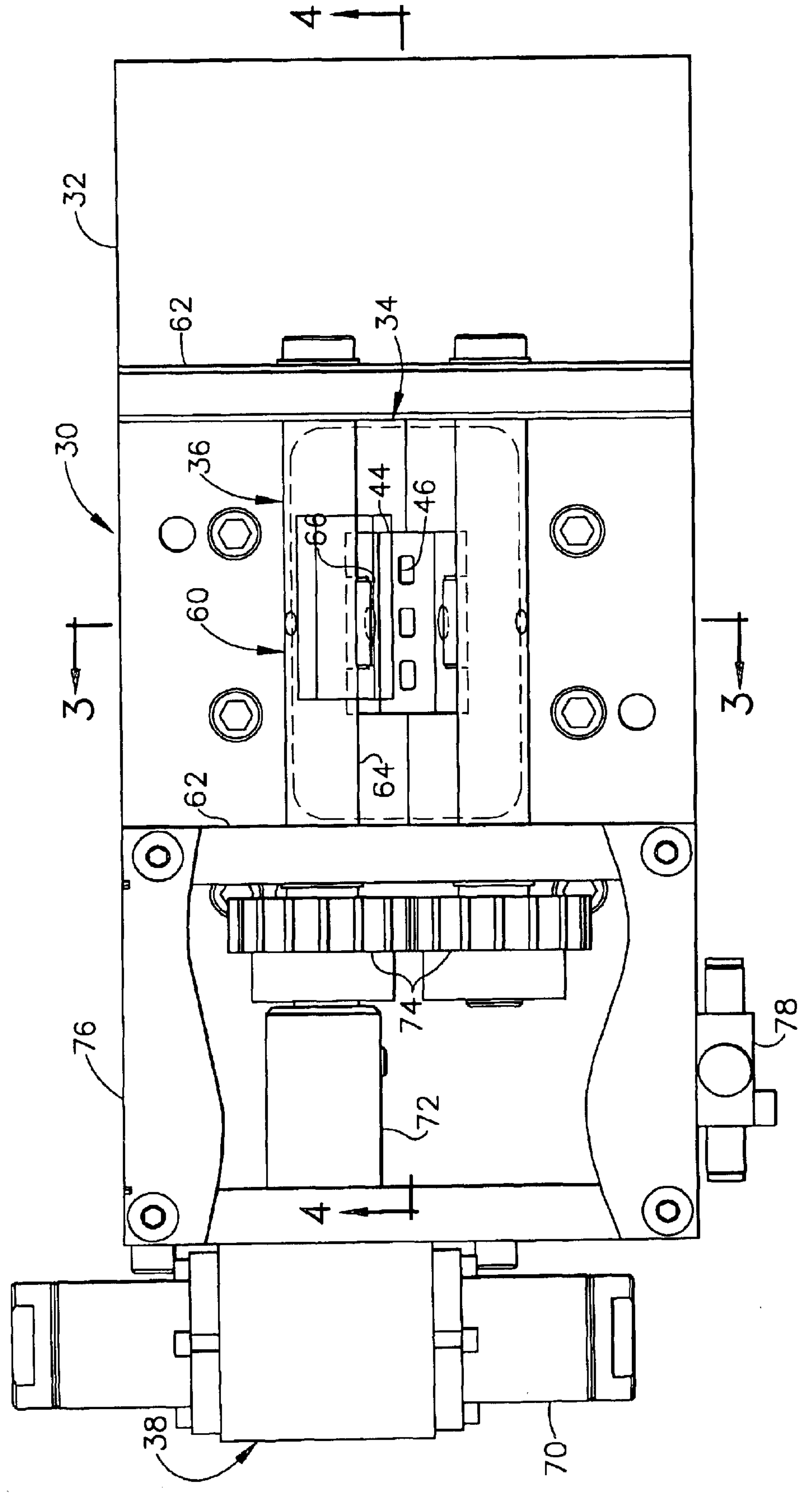
FIG. 2 is a plan of a first embodiment of the fixture of the present invention.

As illustrated in FIG. 2, a fixture of one embodiment of the present invention is designated in its entirety by the reference number 30. The fixture 30 is adapted for holding a gas turbine engine blade 10 as described above during a flow check of the blade. The fixture generally comprises a base 32, a support (generally designated by 34) mounted on the base for receiving the dovetail 12 (FIG. 1), a clamp (generally designated by 36) mounted adjacent the support for selectively clamping the dovetail against the support, and a drive system (generally designated by 38) for driving the clamp between a clamped position and a released position as will be explained in greater detail below.

Figure 3:
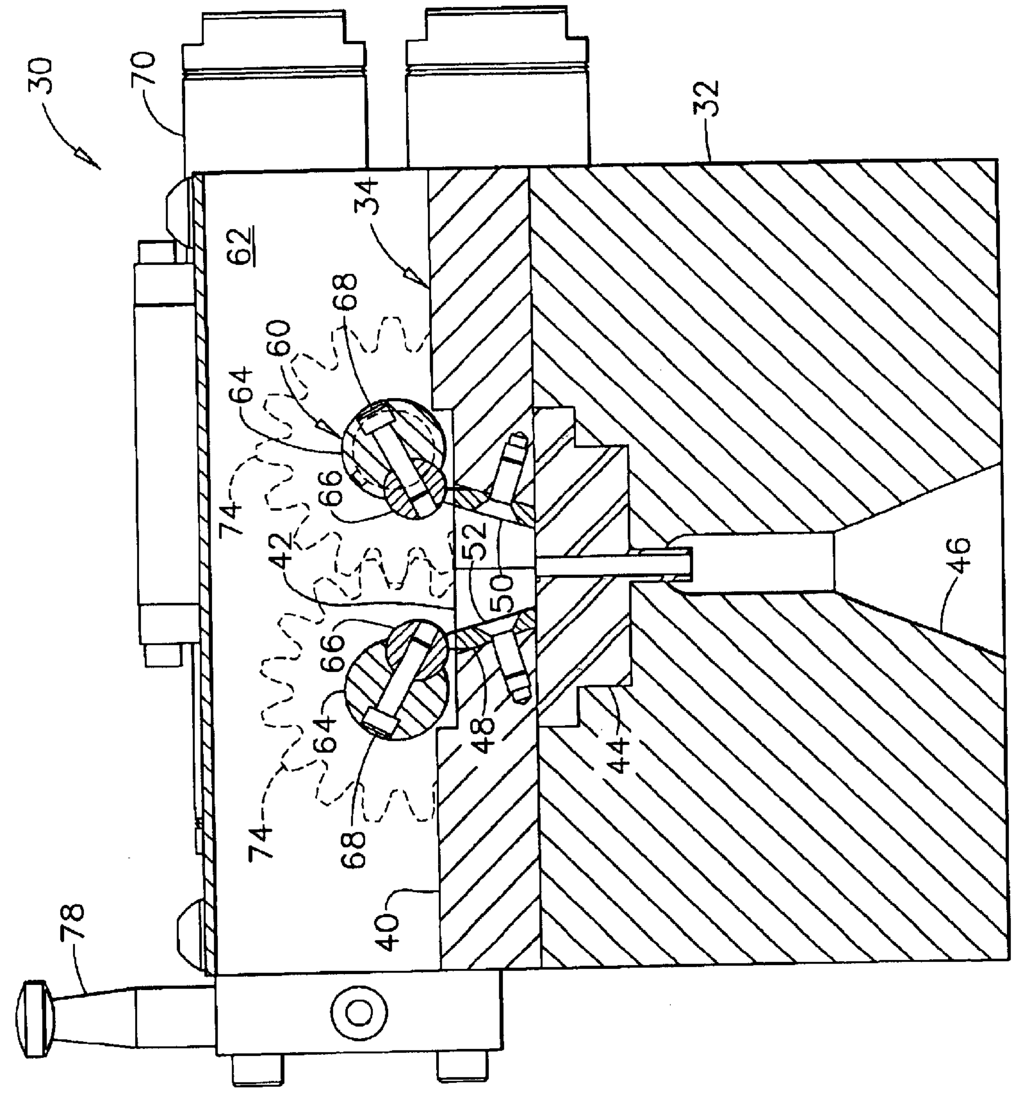
FIG. 3 is a section of the fixture of the first embodiment taken along line 3—3 of FIG. 2.

As shown in FIG. 3, the support 34 includes a pair of plates 40 mounted on the base 32 defining a truncated-V-shaped slot 42. A gasket 44 positioned below the plates 40 forms a seal at the lower end of the slot 42 for sealingly engaging the dovetail 12 (FIG. 1) when it is received in the support 34 to permit fluid to be blown through the openings at the inboard end 26 of the dovetail 12 to flow check the blade 10. Passages 46 extending through the base 32 and the gasket 44 are aligned with the openings at the inboard end 26 of the dovetail 12 to deliver pressurized fluid (e.g., air or water) from a fluid source (not shown) to the openings. As will be appreciated by those skilled in the art, the shape of the support 34 is complementary to that of the dovetail 12 to ensure alignment between the passages 46 extending through the base 32 and the openings in the dovetail.

Although the base 32 and gasket 44 may have other numbers of passages 46 without departing from the scope of the present invention, in one embodiment they have three passages. Preferably, the number of passages 46 corresponds to the number of independent cooling passage circuits in the blade 10 being flow checked. Although the gasket 44 may be made of other materials without departing from the scope of the present invention, in one embodiment the gasket is made from a urethane. Preferably, the gasket 44 is elastomeric so it sealingly conforms to the inboard end 26 of the dovetail 12 when the blade 10 is clamped in the fixture 30.

Figure 5:
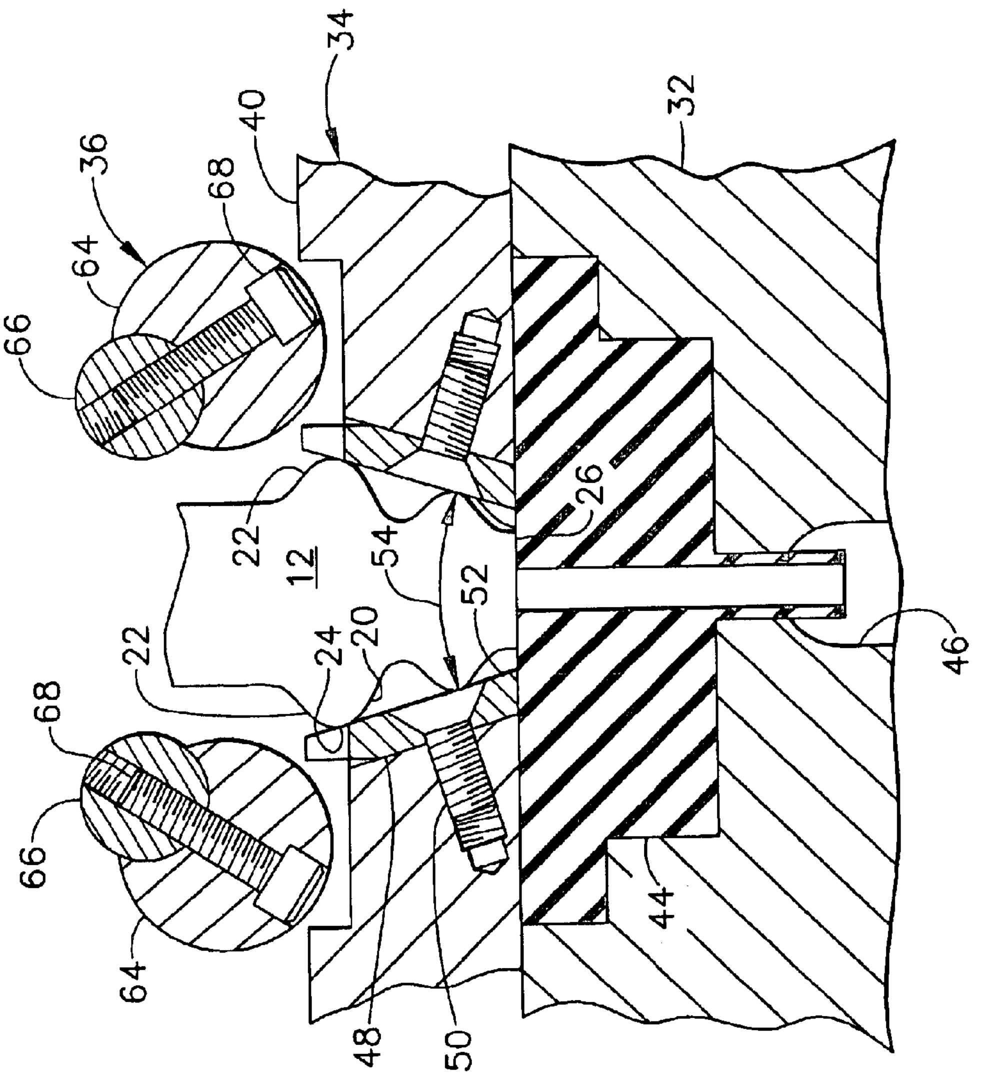
FIG. 5 is a detail of the section of FIG. 4 showing a portion of a blade and a clamp of the fixture in a released position.

Wear plates 48 are mounted on opposing sides the slot 42 with screw fasteners 50 for engaging the dovetail 12. Although the plates 48 may be made of other materials without departing from the scope of the present invention, in one embodiment the plates are made of a material (e.g., stainless steel) which provides sufficient wear and corrosion resistance but which will not scratch or otherwise damage the blade dovetails 12. As illustrated in FIG. 5, the wear plates 48 provide opposing surfaces 52 which laterally engage opposite tips 24 of at least one pair of the protrusions 20 when the dovetail 12 is received in the support 34. Preferably, the opposing surfaces 52 of the plates 48 are substantially planar and angled with respect to each other so that they can simultaneously engage the tips 24 of more than one pair of protrusions 20. Although the plates 48 may be separated by other angles without departing from the scope of the present invention, in one embodiment the plates are separated by an angle 54 (FIG. 5) of between about fifteen degrees and about twenty degrees. Although the wear plates 48 may engage other numbers of the tips 24 without departing from the scope of the present invention, in one embodiment the opposing surfaces 52 laterally engage opposite tips 24 of two pairs of the protrusions 20.

Figure 4:
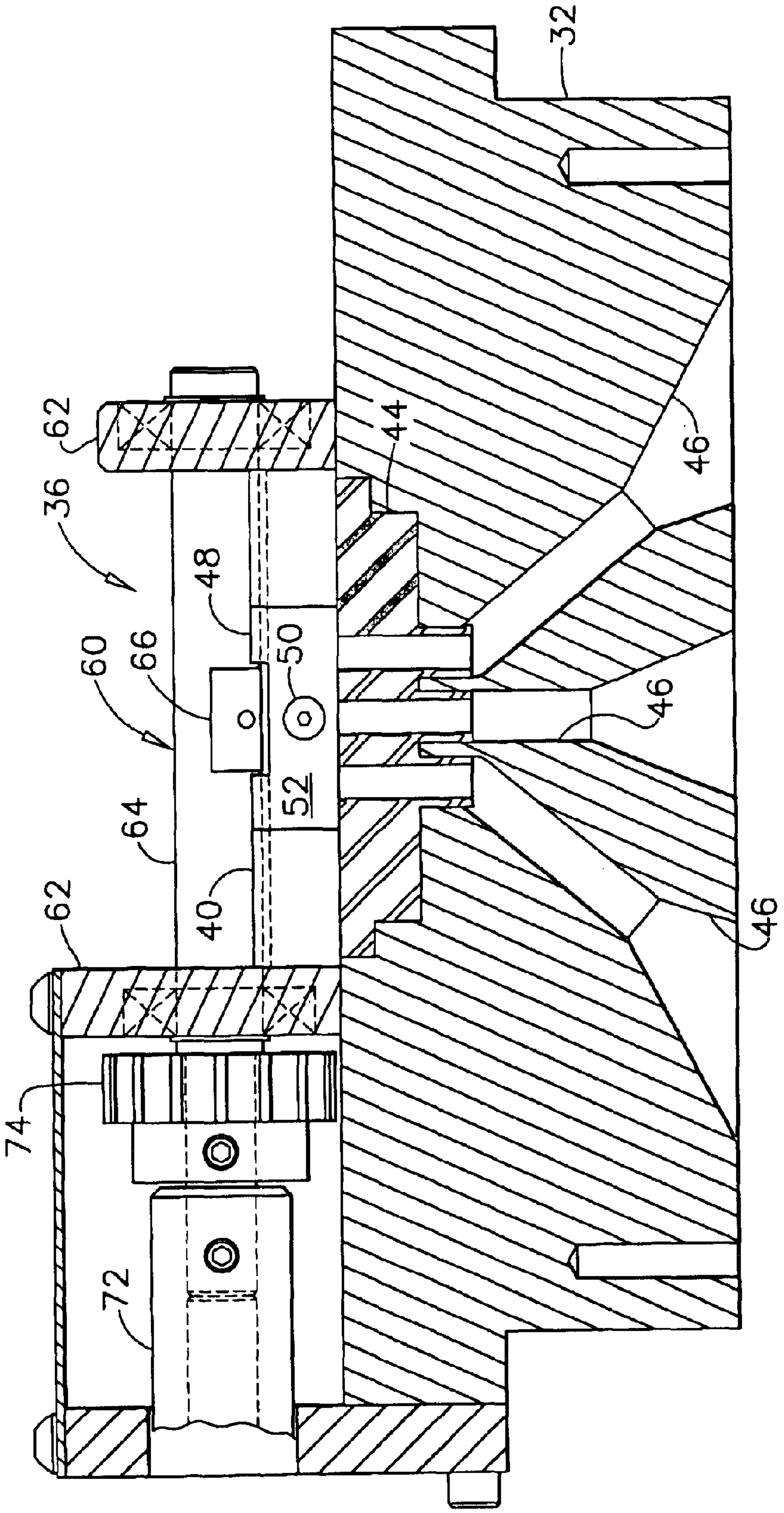
FIG. 4 is a section of the fixture of the first embodiment taken along line 4—4 of FIG. 2.
Figure 6:
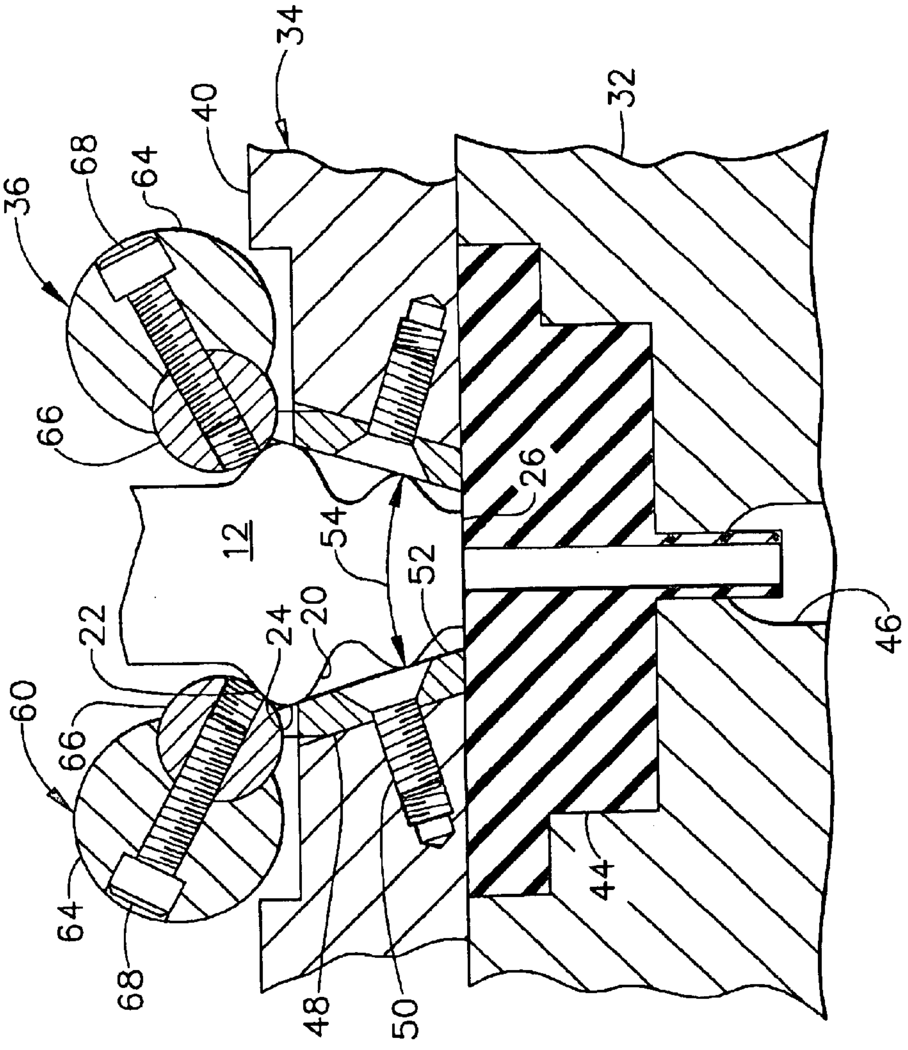
FIG. 6 is a detail of the section of FIG. 4 showing the portion of the blade and the clamp of the fixture in a clamped position.

As illustrated in FIG. 4, the clamp 36 includes a pair of rotatable clamping members, generally designated by 60, (only one of which is visible in FIG. 4) rotatably mounted on supports 62 attached to the base 32 at opposite ends of the slot 42. As shown in FIG. 3, the clamping members 60 comprise shafts 64 journaled in the supports 62 and radial projections on the shafts formed, in one embodiment, by offset rods 66 attached to the shafts by screw fasteners 68. The rods 66 form lobes which engage one of the pressure faces 22 of the dovetail 12 as the clamping member 60 rotates to hold the dovetail against the support 34 and thereby to hold the blade 10 in the fixture 30. Although the rods 66 may be made from other materials without departing from the scope of the present invention, in one embodiment the rods are made of nylon. As illustrated in FIGS. 5 and 6, the clamping members 60 may be rotated between a clamped position (FIG. 6) in which the rods 66 engage respective pressure faces 22 of the dovetail 12 to hold the dovetail against the wear plates 48 thereby holding the blade 10 in the fixture 30, and a released position (FIG. 5) in which the rods disengage and are clear of the dovetail to permit the blade to be loaded into and removed from the fixture. As will be apparent to those skilled in the art, the clamping members 60 center the dovetail 12 on the support 34 as the clamp 36 moves from the released position to the clamped position.

As shown in FIG. 2, the clamping members 60 are driven by a pneumatically powered rotary actuator 70. The actuator 70 is connected to one of the clamping members 60 with a coupling 72. A pair of meshed gears 74 operatively connects the clamping members 60 so they turn in opposite directions when the actuator 70 drives the clamping member 60 connected to it. The coupling 72 and gears 74 are housed in a housing 76. Although other actuators 70 may be used without departing from the scope of the present invention, in one embodiment the actuator is a Model PT074090 pneumatic rotary actuator available from Bimba Manufacturing Company of Monee, Ill. The actuator 70 is controlled by a conventional pneumatic control valve 78 mounted on a side of the housing 76.

Figure 7:
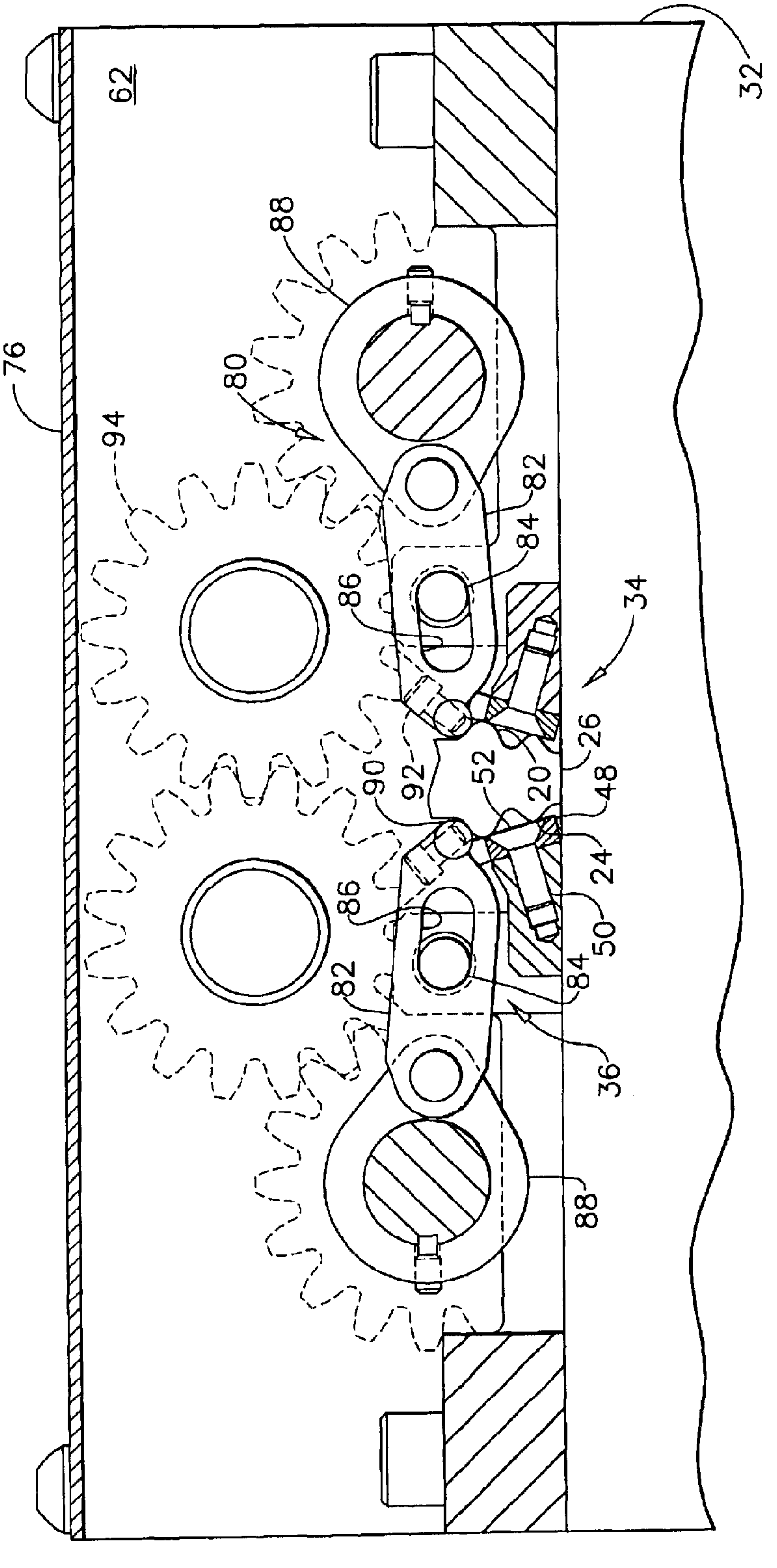
FIG. 7 is a section similar to FIG. 3 showing a second embodiment of the fixture of the present invention.

In an alternate embodiment illustrated in FIG. 7, the clamp 36 includes a crank driven sliding rocker arm mechanism, generally designated by 80. The mechanism 80 includes a pair of pivotally mounted rocker arms 82 mounted on mount pins 84 positioned adjacent each side of the support 34. Each of the arms 82 has a slot 86 which receives one of the pins 84 so the rocker arm can slide and pivot on the pin. The mechanism 80 also includes a pair of cranks 88, each of which is pivotally attached to an end of one of the rocker arms 82 so the rocker arm pivots and slides on the corresponding mount pin 84 as the crank rotates. A replaceable cylindric tip 90 is attached to each rocker arm 82 with a screw fastener 92 to provide a sufficiently soft surface with which to contact the blade dovetail 12. As shown in FIG. 7, a train of meshed gears 94 may be used to transmit the motion from one crank 88 to the other. As with the fixture of the first embodiment, the clamp 36 may be driven by a pneumatically rotary actuator (not shown).

As will be apparent to those skilled in the art, the previously described clamping member and the sliding rocker mechanism may be replaced with other conventional mechanisms such as a cam and follower mechanism without departing from the scope of the present invention.

Further, although the fixture is described as for use in a flow check stand, those skilled in the art will appreciate that the fixture may be used to hold blades during other operations. For example, the fixture may be used to hold the blade when cleaning the interior passages with liquid cleaning agents during maintenance of the engine or to remove media which may have become lodged therein during manufacture. In addition, it is envisioned that similar fixtures may be used to hold the blade during machining operations, particularly after the dovetail shape is established.

As will be appreciated by those skilled in the art, the fixtures 30 described above provide more precise positioning of the blade 10 than prior art designs which engaged the flowpath surface of the platform. This more precise positioning results from the fixtures 30 of the present invention contacting machined features of the dovetail 12 rather than as-cast features.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A fixture for holding a gas turbine engine blade having an airfoil extending outward from a shank and a dovetail extending inward from the shank for attaching the blade to a disk of the engine, said dovetail including at least one pair of protrusions extending fore and aft along opposite sides of the blade, each of said protrusions including a pressure face generally facing the airfoil of the blade for engaging the disk to retain the blade in the disk during operation of the engine, said fixture comprising:

a support for receiving the dovetail and including opposing surfaces for engaging laterally opposite tips of at least one pair of said protrusions adjacent the pressure faces when the dovetail is received in the support; and a clamp mounted adjacent the support for movement between a clamped position in which the clamp engages the dovetail to hold the dovetail against the support thereby holding the blade in the fixture and a released position in which the clamp disengages the dovetail to permit removal of the blade from the fixture.

2. A fixture as set forth in claim 1 wherein the clamp is sized and shaped to engage at least one pair of said pressure faces of the blade to hold the dovetail against the support and thereby to hold the blade in the fixture.

3. A fixture as set forth in claim 1 wherein the opposing surfaces are substantially planar and angled with respect to each other.

4. A fixture as set forth in claim 3 wherein the blade has at least two pairs of protrusions and the opposing surfaces engage the laterally opposite tips of each of said pairs of protrusions when the dovetail is received in the support.

5. A fixture as set forth in claim 2 wherein the blade includes at least one cooling air passage extending through the blade from an inlet port located at an inboard end of the dovetail and the support includes a seal for sealingly engaging the dovetail to ensure fluid is blown through the inlet port to flow check the blade.

6. A fixture as set forth in claim 2 wherein the seal is elastomeric.

7. A fixture for holding a gas turbine engine blade having an airfoil extending outward from a shank and a dovetail extending inward from the shank for attaching the blade to a disk of the engine, said dovetail including at least one pair of protrusions extending fore and aft along opposite sides of the blade, each of said protrusions including a pressure face generally facing the airfoil of the blade for engaging the disk to retain the blade in the disk during operation of the engine, said fixture comprising:

a support for receiving the dovetail; and a clamp mounted adjacent the support for movement between a clamped position in which the clamp engages the dovetail to hold the dovetail against the support thereby holding the blade in the fixture and a released position in which the clamp disengages the dovetail to permit removal of the blade from the fixture, the clamp including at least one pair of rotatably mounted clamping members.

8. A fixture as set forth in claim 7 wherein each of said clamping members includes a lobe adapted to engage one of said pressure faces of the dovetail as the clamping member rotates to hold the dovetail against the support and thereby to hold the blade in the fixture.

9. A fixture as set forth in claim 7 further comprising a rotary actuator for driving said clamping members.

10. A fixture as set forth in claim 9 wherein the rotary actuator is a pneumatically powered rotary actuator.

11. A fixture for holding a gas turbine engine blade having an airfoil extending outward from a shank and a dovetail extending inward from the shank for attaching the blade to a disk of the engine, said dovetail including at least one pair of protrusions extending fore and aft along opposite sides of the blade, each of said protrusions including a pressure face generally facing the airfoil of the blade for engaging the disk to retain the blade in the disk during operation of the engine, said fixture comprising:

a support for receiving the dovetail; and a clamp mounted adjacent the support for movement between a clamped position in which the clamp engages the dovetail to hold the dovetail against the support thereby holding the blade in the fixture and a released position in which the clamp disengages the dovetail to permit removal of the blade from the fixture, the clamp including at least one pair of pivotally mounted rocker arms, each of said arms having a first end adapted to engage one of said pressure faces of the dovetail as the arm pivots to hold the dovetail against the support and thereby to hold the blade in the fixture.

12. A fixture as set forth in claim 11 wherein each of said rocker arms includes a slot which receives a mount pin positioned adjacent the support so that said rocker arm is free to slide and pivot on the pin.

13. A fixture as set forth in claim 12 wherein the clamp includes a pair of rotatably mounted cranks, each of said cranks being pivotally attached to a second end of one of said rocker arms opposite said first end so that the rocker arms pivots and slides on the corresponding mount pin as the crank rotates.

14. A fixture as set forth in claim 13 further comprising a rotary actuator for driving said cranks.

15. A fixture as set forth in claim 14 wherein the rotary actuator is a pneumatically powered rotary actuator.

16. A fixture as set forth in claim 7 further comprising at least one pair of meshed gears operatively connecting said pair of clamping members.

* * * * *